T. FRISCHMANN.
MOLDING MACHINE.
APPLICATION FILED MAR. 5, 1913.
1,103,281.
Patented July 14, 1914.
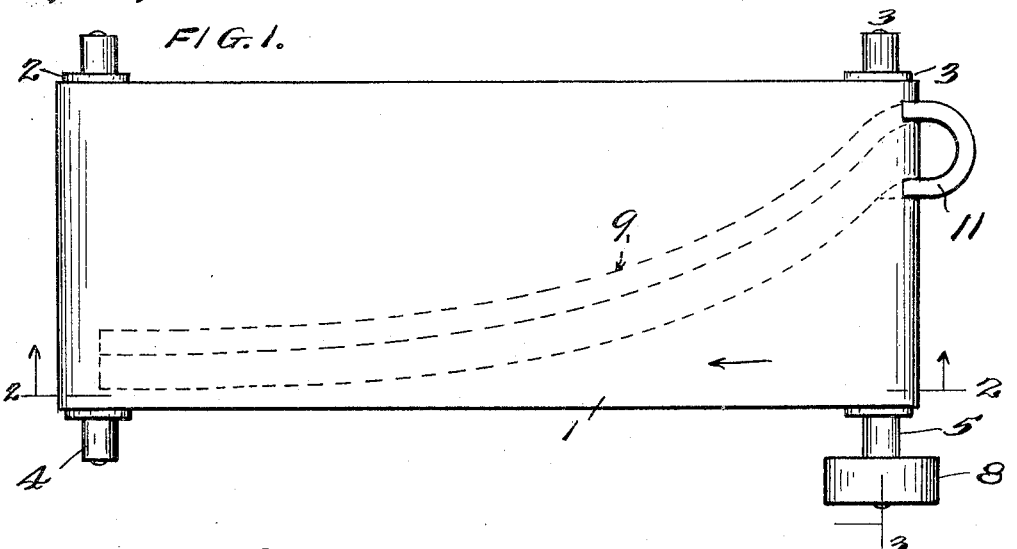
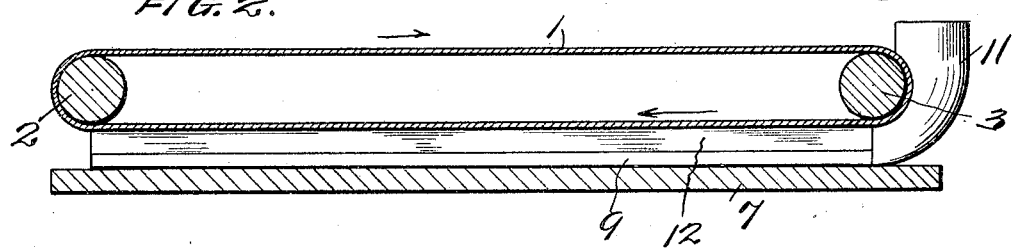
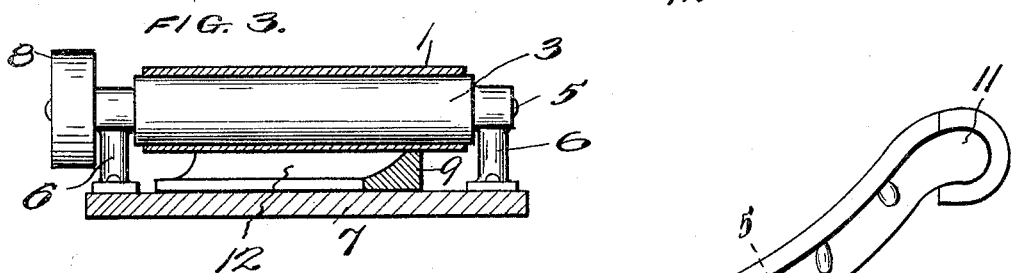
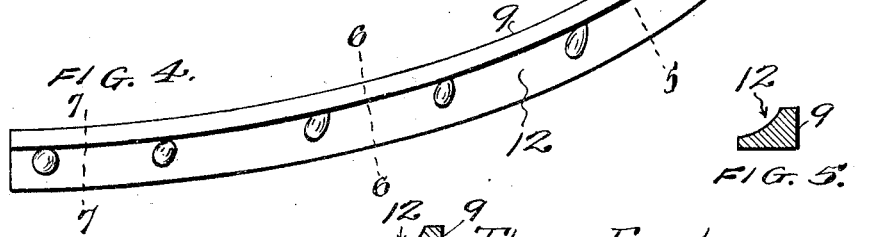
Thomas Frischmann
Inventor ature of the dough, as it is transmitted through the

UNITED STATES PATENT OFFICE.

THOMAS FRISCHMANN, OF CLEVELAND, OHIO.

MOLDING-MACHINE.

1,103,281. Specification of Letters Patent. Patented July 14, 1914.

Application filed March 5, 1913. Serial No. 752,065.

*To all whom it may concern:*

Be it known that I, THOMAS FRISCHMANN, a citizen of the United States, residing at Cleveland, in the county of Cuyahoga and State of Ohio, have invented certain new and useful Improvements in Molding Apparatus, of which the following is a specification.

My present invention relates to improvements in molding apparatus of the rolling type and is adapted especially for use in connection with bread, pastry and confection making.

The object of the invention primarily is the provision of a machine or apparatus for forming dough into balls for biscuits, in the art of bread making, which is facile in operation, simple in construction, durable, and capable of performing the functions of a device of this character in an efficient and economical manner.

The invention consists essentially in a device by which the chunk or piece of dough is rolled or tumbled over and over while in close frictional contact, between an endless traveling belt, and a peculiarly constructed and formed trough or channel. And the invention further consists in certain combinations and arrangements of parts as will hereinafter more fully be pointed out.

In the accompanying drawings I have illustrated one complete example of the physical embodiment of my invention constructed according to the best mode I have so far devised for the practical application of the principles of my invention, and which has proven highly satisfactory in actual use.

Figure 1 is a side elevation of the apparatus involving my invention, seen from the belt side. Fig. 2 is a longitudinal section of Fig. 1 on line 2—2. Fig. 3 is a transverse section on line 3—3. Fig. 4 is a view of the trough showing the channel as a medium along which the dough is conveyed or transmitted during its process of formation. Fig. 5 is a transverse section of the trough on line 5—5 Fig. 4. And Figs. 6 and 7 are similar views on lines 6—6 and 7—7 respectively.

In the preferred embodiment of my invention as illustrated in the drawings I employ an endless vertically arranged belt 1 adapted to travel over the rollers 2, 3, which are supported on the shafts 4 and 5 respectively, and these shafts are journaled in proper bearings, as 6, secured to the base 7 in Fig. 3. A pulley 8 fixed on the shaft 5, when rotated imparts motion to the roller 3, and through this medium the belt 1 is caused to travel in the direction of the arrow in Figs. 1 and 2. The essence of my invention resides in the combination with this traveling belt of the trough 9. The trough is located in close proximity to the traveling belt to provide a channel, as 10, through which the pieces of dough are conveyed, toward the left, from the hopper 11. The trough is fashioned with a longitudinal curvature and the changing radii increase from right to left, *i. e.* the trough is attached to the base or back plate 7 and positioned so that it inclines downwardly from right to left on a curved line of increasing radius.

The trough 9 is formed with a concave channel 12. In cross section the construction of the trough varies, as illustrated in Figs. 5, 6, and 7. Thus the transverse concavity of that portion of the trough at line 5—5 and to the right thereof in Fig. 4, is on a curved line of maximum radius, and the transverse radii of the concave trough decrease from right to left, until the smallest or minimum radius is reached at point 7—7 of Fig. 4. Thus the longitudinal curvature of the trough, or channel 12 has an increasing radius from right to left, but the transverse concavity of the channel has a decreasing radius from right to left, or from the point where the dough is fed to the trough to the exit. This formation and curvature of the trough has the effect of shaping a piece of dough, as it is transmitted through the channel, according to the varying outlines or contours shown in Fig. 4. Thus when the dough is first dropped into the hopper 11 it is of irregular shape and is rolled toward the left between the belt and the open bottom channel. The dough is prevented from falling out of the channel by the action of the belt which continually and constantly urges the dough into the concave upper wall of the trough, or crowd the dough into the corner. In its travel through the trough the dough is first elongated in shape, and then gradually decreased in length until it finally assumes a spherical shape as it reaches the end of the channel. Thus at the initial movement of the dough, the chunk has a long axis at the point where the long radius of the concave exists, and when the chunk of dough reaches the point where the short radius exists in the concavity of the trough the axis is shortened until all radii are equal, and the chunk is in the form of a sphere. In this manner the apparatus produces a perfect sphere or ball of dough with a smooth surface, and without overworking the dough with its accompanying deleterious effects.

Having thus fully described my invention, what I claim as new and desire to secure by Letters Patent is:

The combination with a vertically arranged endless moving belt, of a downwardly inclined open bottom trough parallel with the belt and forming a channel having a longitudinal curvature of gradually increasing radii, and a transverse concavity of gradually decreasing radii.

In testimony whereof I affix my signature in presence of two witnesses.

THOMAS FRISCHMANN.

Witnesses:
W. H. McMorris,
Edward Lindwaeller.

Copies of this patent may be obtained for five cents each, by addressing the "Commissioner of Patents, Washington, D. C."